United States Patent [19]

Serpelloni et al.

[11] Patent Number: 5,527,542
[45] Date of Patent: Jun. 18, 1996

[54] PROCESS FOR SUGARLESS COATING AND PRODUCTS OBTAINED ACCORDING TO THE PROCESS

[75] Inventors: Michel Serpelloni, Beuvry les Bethune; Guillaume Ribadeau-Dumas, Lambersart, both of France

[73] Assignee: Roquette Freres, Lestrem, France

[21] Appl. No.: 241,708

[22] Filed: May 12, 1994

[30] Foreign Application Priority Data

May 17, 1993 [FR] France ................... 93 05918

[51] Int. Cl.$^6$ ..................................... A61K 9/14
[52] U.S. Cl. .................. 424/488; 424/475; 424/493; 424/489
[58] Field of Search .................. 424/488, 489, 424/491, 484

[56] References Cited

U.S. PATENT DOCUMENTS

| | | | |
|---|---|---|---|
| 4,238,510 | 12/1980 | Cherukuri et al. | 426/5 |
| 4,408,041 | 10/1983 | Hirao et al. | 536/4.1 |
| 4,423,086 | 12/1983 | Devos et al. | 427/3 |
| 4,623,543 | 11/1986 | Motegi et al. | 426/103 |
| 4,840,797 | 6/1989 | Boursier | 424/475 |
| 5,229,148 | 7/1993 | Copper | 426/5 |

FOREIGN PATENT DOCUMENTS

| | | |
|---|---|---|
| 0228999 | 7/1987 | European Pat. Off. . |
| 2522250 | 9/1983 | France . |
| 61-263915 | 11/1986 | Japan . |
| 2079129 | 1/1982 | United Kingdom . |
| WO91/09989 | 7/1991 | WIPO . |

OTHER PUBLICATIONS

—DATABASE WPI, Derwent Publications Ltd., London, GB; AN 87–003714 & JP-A-61 263915 (Hayashibara Biochem.).
—DATABASE WPI, Derwent Publications Ltd., London, GB; AN 91–153780 & JP-A-3 090 020 (Tanabe Seiyaku).
—FOOD TECHNOLOGY vol. 21, No. 1064, Aug. 1967 pp. 12–14 L. Jokay et al. 'development of edible amylaceous coating for foods'.
—CHEMICAL ABSTRACTS, vol. 96, No. 9, Apr. 1982, Columbus, Ohio, US; abstract No. 14129r, S. R. Cherukuri et al. 'sugarless coating for chewing gum and confections' abstract & ZA-A-8 003 927 (S. R. Cherukuru et al.).

Primary Examiner—Thurman K. Page
Assistant Examiner—William E. Benston, Jr.
Attorney, Agent, or Firm—Larson and Taylor

[57] ABSTRACT

The present invention relates to a process for coating with maltitol making it possible easily and rapidly to create a coating on the surface of a product. This process consists, on the one hand, of the application of a carbohydrate syrup, of a protein syrup or of steam and, on the other hand, of the application, in pulverulent form, of a quantity of maltitol powder which has a purity higher than 87%.

9 Claims, No Drawings

PROCESS FOR SUGARLESS COATING AND PRODUCTS OBTAINED ACCORDING TO THE PROCESS

The present invention relates to a process for coating with maltitol making it possible easily and rapidly to create a coating on the surface of a product.

It also relates to the coatings and the coated products obtained by applying the process.

Maltitol is an alcohol sugar, with a sweet taste close to that of sugar, and of chemical formula $C_{12}H_{24}O_{11}$. It is produced industrially especially by hydrogenation of D-maltose, itself originating from the hydrolysis of starch or of tuber starch under highly specific conditions.

Maltitol has been marketed for about twenty years in the form of so-called noncrystallizable syrups containing only 20 to 65% of maltitol. Products marketed under the trade marks Polysorb® and Lycasin® 80/55 are known in particular.

It is by virtue of the progress in the fields of enzymology and of separating techniques that syrups which are richer in maltitol, containing from 70% to 87% of it have subsequently appeared, such as the products sold under the trade marks Maltisorb® 75/75, Malbit® and Maltidex®, as well as pseudocrystalline maltitol powders generally containing 82 to 87% of maltitol, among which the products marketed under the name of Malti-Towa and the trade mark Malbit® will be recalled.

It is only in the last few years that maltitol powders of purity higher than 90%, such as the product sold under the trade mark Amalty® have been successfully prepared on an industrial scale by the use of new technology. Other, still purer, powders contain more than 95% and reach even 99% of maltitol. A product in this class is a crystallized one known under the trade mark Maltisorb®. In the context of the present invention particular interest will be attached to these products of high purity.

Coating is a unit operation in a considerable number of fields including those of confectionery, pharmacy, the seed and fertilizer industry, as well as in the industry of additives such as flavours, sweeteners, vitamins, enzymes, acids and plant-protection products. This operation consists in creating a coating on the surface of solid or pulverulent products which it is desired to protect for various reasons or else to make visually or gustatorially attractive.

A number of types of coating are in existence:

Gumming (or glazing) is a technique in which syrups of noncrystallizable and generally nonhygroscopic substances such as gum arabic, modified starches and celluloses and maltodextrins are used. After one or two applications of the syrup to the product to be coated, this technique makes it possible to create a vitreous film forming a barrier to the migration of oxygen, water or fats. Powders of various kinds can also be employed in this process together with these noncrystallizable syrups, so as to bind the water introduced by the syrups. In yet other cases, sugars or polyols which are molten or liquefied by solvents are employed. The hard and brittle vitreous coating is then obtained by cooling or by evaporation of the solvents.

Soft coating, which consists in creating a rather flexible and soft coating on the surface of the products. This coating is obtained by repeated applications, on the one hand, of a noncrystallizable syrup such as generally starch hydrolysates and, on the other hand, of a powder, generally of crystallized sucrose. The coating is usually thick. In fact, the engrossing, that is to say the increase in weight of the products considered at the end of the operation in relation to the beginning, related to the final weight of the products, is of the order of 10 to 80% or even more. It should be noted that the substance of which the syrup consists is usually other than that of the powder and that no drying is furthermore carried out.

Hard coating, which requires the use of a syrup containing crystallizable substances. A hard and crystal-line coating is then obtained by the application of the syrup and evaporation of the water introduced by the latter, by virtue of drying using hot dry air. This cycle must be repeated a very large number of times, that is to say a number which is much greater than that needed in soft coating to obtain an identical engrossing. In the present case the latter is generally close to 20%. Hard coating is aimed at obtaining a crunchy and sweet layer, always highly appreciated by the amateurs of confectionery.

Smoothing, which consists of one or two applications or charges of a crystallizable syrup which is dilute when compared with that employed in hard coating. The aim is often to apply a finish to the surface appearance of coated products.

Frosting, which is also aimed at improving the appearance of the product, but also at isolating the latter from atmospheric moisture. This technique resembles a hard coating, in the sense that a crystallizable syrup is employed. The essential difference lies in the fact that the number of cycles carried out is only one, two or three.

Sanding, which consists in making fine sugar crystals adhere to the surface of the products by moistening them beforehand with rather dry steam or with a hot solution of gum arabic or of maltodextrin. The products are subsequently always dried.

Wet crystallization, which is a technique by which a crystalline coating is created on the surface of the products by immersing them for a few hours in a supersaturated syrup of crystallizable substance. The surface of the products is thus embellished by the presence of a coat of microcrystals.

Within the context of the present invention interest will be concentrated on all the techniques that may require the use of a coating turbine or of a rotary equipment with a similar effect, that is to say on all the coating techniques described above with the exception of wet crystallization. It should be known, furthermore, that these techniques can be combined. For example, a hard coating can be preceded by a gumming and followed by a smoothing.

A number of these coating processes have been applied by employing polyols such as sorbitol, mannitol, xylitol, hydrogenated starch hydrolysates, maltitol, lactitol, erythritol and hydrogenated isomaltulose. They are extensively described in the literature. They can be classified into two large categories.

A first group of processes is commonly employed industrially in particular for sorbitol and xylitol. These processes resemble a hard coating operation and consist in applying a crystallizable syrup or suspension to the surface of the products which it is desired to coat, in general confectionery. The word crystallizable is intended to mean the fact that the syrup or the suspension of polyol applied to the surface of the products is sufficiently rich in one or other of the polyols given above with the result that a coating of crystalline nature is obtained by evaporation of water by means of air in the coating turbines. Such processes have been described many times. By way of example there will be mentioned Patent EP 37 407, which belongs to the Applicant Company and which relates to sorbitol. Also to be recalled is Patent EP 201 412, which also belongs to the Applicant Company and Patent JP 61 263 915, both of which deal specifically with the use of maltitol syrups.

These processes, which actually correspond to a hard coating operation, are characterized by the fact that they include a large number of cycles in the manner of the traditional process with sugar. Each of these repetitive cycles always comprises a first stage of spraying polyol syrup on the moving bed of products to be coated, a second stage permitting the uniform distribution of this syrup on the surface of the products and finally a third stage of drying by blowing hot dry air, ensuring the evaporation of the water introduced by the syrup and hence the crystallization of the polyol applied.

It will therefore be very well understood that these processes generally suffer from their extreme slowness. This is accounted for by the fact that, unless products which must remain individualized are to be seen to set solid, it is essential to spray very small quantities of syrup a large number of times and at intervals in time. These quantities are of the order of 10 to 30 grams per kilogram of products to be coated, which corresponds to an added quantity of polyol of between 6 and 20 grams per kilogram of products. Thus, to increase the weight of the articles by of the order of 20%, a number of hours or even several days are necessary.

This serious disadvantage is undoubtedly remedied either by increasing the capacity of the coating turbines or by automating the existing plants so as to shorten each of the spraying, distributing and drying sequences as much as possible, or else by increasing the number of industrial turbines. It is readily understood that these remedies are merely partial, because they do not remove the problem at the source, and are necessarily reflected in extra costs which are not negligible.

Another disadvantage of these processes lies in the fact that they lack flexibility. In fact, to obtain the desired final result, it is always necessary to work in a repetitive manner. Automation, once installed, controls the problem but, in this case, it is possible to coat easily only a single, very particular type of product. In fact, the coating conditions are not the same and must consequently be reviewed when it is desired to coat, for example, chewing gums and then tablets or else two chewing gums of different texture or form.

There is a second category of coating processes using polyols, which combine the use of a syrup and that of a powder. It should be noted that the polyol present predominantly in the syrups may or may not differ in nature from the polyol present principally in the powder.

This category of processes, which is rather similar to a soft coating, still differs widely from the invention described in detail below in the nature of the polyols employed which, as a person skilled in the art knows, exhibit more differences than similarities between them insofar as their physicochemical and organoleptic properties are concerned.

Such processes are described very well in the literature. Processes which will be recalled in particular are those disclosed:

By U.S. Pat. No. 4,238,510 relating to a coating containing from 45% to 90% of sorbitol; the coating of the confectionery products is obtained by means of drying with dry hot air in a turbine and application of a polyol syrup and of a mixture of sorbitol and mannitol powders. This process is still very long, since it requires several days. In addition, it also lacks flexibility because it makes it possible to prepare only soft surface coatings, never hard and crunchy ones like those generally desired by the consumers.

By Patent Application WO 91/09 989, relating to a coating operation using sorbitol. As described, the process, while resembling a soft coating process, has as its real objective only that of obtaining highly crystalline coated layers which are hard and brittle, like those described in the Applicant Company's Patent EP 37 407, referred to above. The need for drying during the coating and also the fact that it is impossible to obtain soft layers, mean that the process is not yet entirely satisfactory, although it is capable of producing large savings in time.

By U.S. Pat. No. 4,623,543, relating to low-calorie sweets coated with maltitol (or reduced maltose). It is recommended to spray the surface of the sweets with a maltitol syrup prepared optionally by dissolving reduced maltose in powder form in water and then performing a drying operation at a temperature of 40° to 55° C. for 8 to 15 hours. It is said that powdered maltitol of fine particle size can be employed in the process just before the drying, but the quantities given in Example 1 are so small, of the order of 0.2%, that the part played by this pseudocrystalline and impure powder can undoubtedly amount merely to that of a crystallization initiator. It nevertheless remains that the process as described is very long and consequently remains imperfect. It should be noted, furthermore, that this document strengthens the person skilled in the art in the idea that a coating operation with maltitol can be carried out only by using a process which is long and costly in energy. It therefore tends to turn him away from the use of maltitol.

Aware of this finding, the Applicant Company noticed that efforts were still being made to develop a coating process advantageously employing polyols as replacements for sugar, which process would not have the disadvantages described above, that is to say which would exhibit all the following advantages:

that of being very rapid and, as a result, permitting considerable savings of time and consequently great savings in capacity, that of being simple to install industrially, that of being highly flexible, that is to say making it possible, on the one hand, to obtain both soft coated layers and hard and crunchy layers or else layers consisting of microcrystals and, on the other hand, of being suitable for the coating of extremely varied products, that of permitting the preparation of coated products of very high quality, non-tacky and not changing significantly in appearance or texture with the passage of time.

It is after having studied precisely the crystallization properties of maltitol that the Applicant Company became aware that a maltitol powder of high crystallinity could be of great interest in the coating processes using polyols. It is by reproducing a soft coating process by using a crystallized maltitol powder of a purity close to 99%, in combination with a maltitol syrup containing more than 85% of maltitol on a dry basis, that the Applicant Company found that, surprisingly and unexpectedly, extremely hard and brittle coatings were obtained by waiting for only a few hours before packaging the products, this being, against all expectations, without having to perform long and expensive stages such as drying, in contrast to what it would have been logical to do by following the recommendations given in the prior art for all the other polyols, as well as sugar, in order to obtain such a result with such rapidity.

Continuing its research work, the Applicant Company found that the powder purity employed was an essential factor. In fact, although the use of a maltitol powder of low purity is found to be possible to produce a soft or hard, vitreous coating in combination with a syrup, the final result is then mediocre and the products obtained are always sticky. The use of a maltitol powder of purity higher than 87% solves the problem.

Furthermore, when it is desired to obtain a hard and crunchy coating on the surface of a product by the combined use of a syrup and of a maltitol powder, only the combination of a powder of very high purity and of a syrup which is very rich in maltitol in relation to its solids content is found to be satisfactory.

The present invention relates, therefore, to a process for coating with maltitol making it possible to create a coating on the surface of a product, characterized in that it comprises, besides the application of a carbohydrate syrup, of a protein syrup or of steam, the application, in pulverulent form, of a quantity of maltitol powder which has a purity higher than 87%.

To measure the purity of this powder a high performance liquid chromatography will be carried out in the usual conditions of measurement.

Powders other than maltitol powder can be employed in the process in accordance with the invention, although this is generally pointless. In the event where a mixture of pulverulent polyols happened to be employed, the maltitol powder should be used as main component and should preferably represent more than 70% of the mixture.

The quantity of maltitol powder of high purity, applied according to the process, will always represent at least 5%, preferably at least 15%, of the mass of the coating for products such as are intended to be marketed. This quantity of maltitol powder will vary more preferably from 20 to 99.5% depending on the type of coating prepared.

According to the general preferred method of the invention, the products to be coated will be subjected to a rotary movement in a coating turbine. The latter may be of ordinary shape, that is to say a tulip shape with a sloping axis of revolution, or else a cylindrical shape with a horizontal axis. The products, which are then preferably always freed from dust, before or after being introduced into the turbine, will be preferably of spherical, cylindrical or oval shape in order to facilitate the coating operation, but can equally well be cushion- or tablet-shaped.

The process in accordance with the invention makes it possible, easily and rapidly, to produce coatings of high stability and in a large variety, that is to say either soft or else hard and crusty, or yet again hard and vitreous or, finally, made up of microcrystals. In this respect it has very great flexibility. It suffices for this purpose to vary the maltitol richness of the syrup employed, the purity of the maltitol powder and the ratio between the quantities of powder and of syrup which are applied. Other parameters such as the rate of coating, the air ventilation or its absence, are undoubtedly important, but to a lesser degree.

For example, when a powder of rather low purity, of between 87 and 95%, is employed, it is possible to obtain relatively hard and crunchy layers insofar as a syrup which is particularly rich in maltitol is used in combination with it.

This being so, maximum flexibility is obtained for the process in accordance with the invention through the use of a maltitol powder which has a purity higher than 90% and preferably higher than 95%, the ideal being to choose in all cases a maltitol powder which has a purity higher than 98%, or even, if possible, 99%.

The process in accordance with the invention makes it possible to coat very diverse products. They may be alimentary products such as, for example, confectionery such as chewing gums, tablets, lozenges, jellies, liqueur eggs, chews, hard sweets, chocolate products, breakfast cereals, as well as pharmaceutical or veterinary products such as pills, tablets, products for animals, dietetic products such as plant granulates, seeds or grain, agglomerated fertilizer powders or additives based on enzymes or on microorganisms, intended in particular for the manufacture of alimentary goods such as bread or industrial products such as washing powders, pulverulent additives composed of vitamins, flavours, perfumes, acids, sweeteners or of various active principles.

According to a general embodiment of the invention, the process consists in uniformly moistening the surface of the products with the aid of preferably dry steam or with the aid of a carbohydrate or protein syrup and in setting them in motion. A quantity of maltitol powder of high purity is then added in pulverulent form. After distribution of the powder a new moistening-powder addition cycle may be carried out. In this case the second cycle will be preferably delayed by a few minutes after the first cycle in order to allow the surface of the products to dry. There is nothing to prevent this drying being facilitated by a flow of dry air. On the other hand, it is generally unnecessary to subject the products after coating to a drying operation in an oven or in a conditioned room, in contrast to what is commonly done for polyols, with the result that here, too, savings in time and energy are possible. It should be noted that the process in accordance with the invention requires at least one, but preferably two, applications of a maltitol powder of high purity, in pulverulent form. These applications may be carried out during the same cycle or else during different cycles, it being known that a cycle is defined in the present invention as including only a single application of a carbohydrate or protein syrup or a single application of steam.

According to another general embodiment, the steam or the carbohydrate or protein syrup are applied to the products placed in a turbine which also contains a quantity of maltitol powder of high purity.

The carbohydrate syrups which can be used in the process of the invention will have a composition the nature of which will be chosen as a function of the desired coating type. This will be, in particular, maltitol syrups or syrups of low-calorie saccharides. The latter will be compounds which have a calorific value lower than that of sugar and may be chosen from alcoholsugars other than maltitol, polydextroses, oligofructoses, dextrins, cellulose-based substances, gum arabic and pectins. The syrups obtained by mixing maltitol and the low-calorie saccharides referred to above can also be suitable.

With regard to the protein syrups, preference will be given to bone or skin gelatin syrups. These syrups will be preferably mixed with the carbohydrate syrups defined above in the case where the use of these two syrups is found necessary. Thus, the use of protein syrups is facilitated thereby.

In its general method, the process in accordance with the invention is always markedly shorter than the processes of the prior art. In general, the total coating period will never exceed 5 hours. For example, very high engrossments close to 50% can be obtained in less than three hours. For lower engrossments, of the order of 20%, a period which is at most less than a half will need to be allowed for, and, in general, approximately 1 hour.

According to a first method the coating process is a gumming process in which syrups containing less than 85% of maltitol in relation to their soluble dry matter content are employed for this purpose. In particular, some hydrogenated glucose syrups which are lean in maltitol, just like the saccharide syrups defined above, are suitable. Their dry matter contents will consequently be preferably between 20 and 50%.

The usual quantities of syrup, employed during a cycle, will then be of the order of 2 to 15 milliliters per kilogram of products to be coated. One to three cycles will generally be sufficient.

With regard to the quantity of maltitol powder of high purity to be employed, unit portions of the order of 20 to 30 g per kilogram of products to be coated will be recommended. In all cases it will be preferred to employ fine powders containing less than 10% of particles with a diameter greater than 250 microns and less than 10% of particles with a diameter smaller than 40 microns. An ideal powder will have a mean diameter of between 80 and 100 microns.

The coatings obtained in accordance with this first embodiment are of a high quality. In particular, their adhesiveness to the coated products is excellent and markedly improved when compared with that which would be obtained by using pulverulent sorbitol in similar conditions. These coatings, which are hard and vitreous, preferably contain from 60 to 954 of maltitol. The quantity of maltitol powder introduced in pulverulent form may reach 80 to 95% of the final coating obtained. Finally, the normal engrossment is approximately from 2 to 5%.

According to a second embodiment the coating process is a process for soft coating, optionally preceded by a gumming, making it possible to obtain a soft and non-sticky coating containing from 20 to 95% of maltitol. The quantity of maltitol applied in pulverulent form, using unit portions of 20 to 90 grams per kilogram of products to be coated during one or more cycles represents in this case in all approximately 80 to 95% of the coating of the products in the form intended for marketing.

As in the preceding case, syrups containing less than 85% of maltitol and preferably from 10 to 75% of maltitol or, still more preferably, between 65 and 75% are employed in this case. The low-calorie saccharide syrups described above are also suitable. To be ideal, these syrups will furthermore contain from 0.5 to 5% of gelatin.

According to this particular method the sprayed quantities of syrup will be generally of the order of 10 to 35 milliliters per kilogram of product. The dry matter content of these syrups will preferably be between 50 and 85%. The number of cycles necessary to arrive at an engrossment of between 10 and 80% will be from 1 to 20.

The temperature of the syrup will be generally that of the environment but, in order to obtain a great uniformity of the distribution of the syrup, a higher temperature may be chosen, enabling the viscosity of the coating syrup to be lowered to less than 300 centipoises.

In normal conditions it will not be necessary to envisage drying by stoving or in a conditioned room. If need be, and only in order to obtain slightly harder layers, a flow of dry air may be maintained between the different cycles. The process will thus always be very fast.

Finally, a smoothing may allow the appearance of the products to be improved. The use of fats or waxes aimed at waterproofing the coating while improving its visual appearance may also be envisaged.

According to a third embodiment the coating process makes it possible to prepare a coating made up of a plurality of microcrystals of maltitol and composed of 95 to 99.5% of maltitol. A sanding operation will then be involved. The products will be moistened with steam or else with a maltitol syrup containing less than 85% of maltitol.

This moistening may be carried out before, during or after the application, in pulverulent form, at the surface of the products, of a quantity of maltitol of high purity of the order of 50 to 250 grams per kilogram of products to be coated. The number of cycles will be generally only one and the engrossment will be normally between 7 and 15%.

It should be noted that, in contrast to the other embodiments of the invention, a coarse particle size will be adopted here for the maltitol powder. The mean diameter of the latter will be from 300 to 1500 microns, depending on the intended result. Furthermore, a powder of very high crystallinity and of very high purity will preferably be adopted here, even more so than in the preceding two methods, the ideal being to employ a powder exhibiting a purity of more than 98%.

According to a fourth method the process in accordance with the invention is applied as described below to obtain a hard and crunchy coating. The process may then be a frosting, a hard coating or a smoothing.

Nevertheless, a carbohydrate syrup containing more than 85%, preferably more than 90% and still more preferably more than 95% of maltitol will always be employed in this case, these contents being calculated in relation to the soluble dry matter content. These syrups will be preferably prepared from a maltitol powder which has a purity higher than 85%, like that employed in pulverulent form, and from a gelatin. The latter will then represent 0.5 to 5% of the dry matter content of the syrup employed.

The number of cycles needed for coating the products will be from 1 to 10 for a hard coating, from 1 to 3 for a smoothing and from 1 to 5 for a frosting. Each cycle will comprise the spraying of 5 to 35 milliliters of a syrup which has a dry matter content of between 50 and 85% in the case or a frosting or of a hard coating, and the spraying of 15 to 50 milliliters of a syrup with a dry matter content of between 40 and 60% in the case of a smoothing. These quantities, which correspond to the quantities used in each cycle for coating one kilogram of product, will vary according to the nature of the latter and in particular according to its porosity. It will be preferred to introduce a hot syrup at the surface of the products in order to promote the removal of water. Simple blowing with dry air may optionally make it possible to facilitate this water removal. The quantities of maltitol powder introduced during one or more cycles will be generally between 5 and 70 grams per kilogram of products to be coated, the lowest values being preferred during a smoothing operation.

It will be recalled that the maltitol content in the coatings will reach 95 to 99.5%, preferably 98 to 99.5% in the case of a frosting or of a hard coating and that this content will be only higher than 80% in the case of a smoothing.

With regard to the quantity of maltitol powder introduced in pulverulent form into the coatings of products in the form intended for marketing, this will generally represent 65 to 90% for a frosting and a hard coating, and 40 to 80% for a smoothing.

The use of the invention according to the fourth method as described above makes it possible to obtain products which have a crunchy coating after a few hours storage before packaging. There is no absolute need to carry out a stoving operation. It should be noted, furthermore, that the layer obtained in this case is extremely white without even having to add whitening agent such as titanium dioxide or calcium carbonate, which are usually always necessary with other polyols and sugar.

The invention also relates, as a new product, to a surface coating intended to protect or embellish a product, consisting of at least 5%, preferably of at least 15% and more preferably from 20 to 99.5% of maltitol powder which has a purity higher than 87%, preferably higher than 90%, more preferably higher than 95% and still more preferably higher than 98%.

The means for making use of the process in accordance with the invention which are described above are not limiting in any way and are merely intended to relate to advantageous and preferred means of implementation. The flexibility and rapidity of carrying out the process, and its many other advantages listed above, will probably be capable of being understood better in the light of the examples which follow.

EXAMPLE I

Gumming process with the application, in pulverulent from, of a quantity of maltitol powder of very high purity.

1. Products employed

Gumming of Jellies (called "jelly beans" in the United States) containing polyols as a replacement for the sugar and for the glucose syrup is carried out.

The latter have the following composition:

| - Lycasin ® 80/55 maltitol syrup: | 82.0% |
| - Neosorb ® P100 sorbitol powder: | 2.0% |
| - Ruban ® Yellow CS pectin: | 1.2% |
| - Citric acid: | 0.8% |
| - Water: | 14.0% |

The gumming is carried out by using:

a solution of gum arabic with a dry matter content of 32%, prepared from a gum sold by the Iranex company, a fine maltitol powder of purity higher than 99%, which has a particle size such that the mean particle diameter is approximately 100 microns, and obtained by screening a maltitol powder marketed by the Applicant Company under the trade mark crystallized Maltisorb®.

2. Conditions and results.

One kilogram of jellies is introduced into a tulip-shaped coating turbine with an oblique axis at 45 degrees. The turbine is set in rotation at a speed of 20 revolutions/minute.

3 grams of the gum arabic solution are sprayed on the surface of the jellies and then 5 grams of fine maltitol powder of high purity are added. The coating obtained is then allowed to dry for a few minutes. This constitutes a first coating cycle.

The above cycle is next repeated three times. During the last cycle ventilation with a flow of cold dry air is carried out for 10 minutes at a rate of 150 cubic meters/hour.

The total duration of the coating process is approximately 60 minutes for an engrossment close to 5%.

The content of maltitol powder introduced solely in pulverulent form to obtain this hard and vitreous coating is of the order of 82%.

The adhesiveness of the coating obtained at the surface of the jellies is excellent, although the jellies are soft. Such a result cannot be obtained with sorbitol powder of a purity and of a particle size which are identical with those of the maltitol powder employed here.

EXAMPLE II

Soft coating process with the application in pulverulent form of a quantity of maltitol of very high purity.

1. Products

Egg-shaped hard sorbitol tablets are employed in this example.

The coating syrup employed is prepared by mixing a maltitol syrup in a proportion of 90% and a gelatin syrup in a proportion of 10%.

The maltitol syrup employed is a syrup marketed by the Applicant Company under the trade mark Maltisorb® 75/75, containing 75% of maltitol in relation to its dry matter content and containing 25% of water in relation to its commercial state.

The gelatin syrup is prepared, with a dry matter content of 20%, from a gelatin marketed under the name gelatin AT 700 by the company Sanofi Bioindustries.

The coating syrup thus prepared is diluted to a dry matter content of 60%.

Four products in powder formate employed in this example in combination with the coating syrup;

the first is the fine maltitol powder of very high purity described in Example I, the second is a powder of the same particle size, not marketed, which has a maltitol purity of 92%, the remainder of its dry composition consisting essentially of sorbitol and of maltotriitol, the third powder is a commercial powder sold under the name of Malbit® CR. It contains only 87% of maltitol. It has been screened to obtain a particle size very closely related to the first powder, the fourth powder is in fact a pulverulent mixture including:

70% of fine maltitol powder of high purity,

15% of mannitol SP marketed by the Applicant Company,

10% of calcium carbonate powder,

5% of titanium dioxide powder.

The last two powders are situated at the limits of the invention and are employed in order to understand properly the problems relating to the use of an insufficiently pure maltitol powder.

It should be noted that the above fourth powder corresponds to a mixture whose proportions are given in U.S. Pat. No. 4,238,510 and in which the Applicant Company has replaced the crystallized sorbitol powder with crystallized maltitol of very high purity and of fine particle size, although this is not in any way envisaged or suggested in the patent.

2. Conditions of the soft coating

Half a kilogram of tablets is introduced into the turbine of Example I.

The coating syrup is applied a first time at a temperature of 50° C. onto the moving tablets, in a proportion of 5 milliliters.

After approximately 2 or 3 minutes 30 grams of fine maltitol powder of very high purity of Example I are added. A distribution period of approximately 3 minutes is allowed to elapse.

This cycle is repeated nine times with the same powder and the same coating syrup, the frequencies being increased but the quantity of maltitol powder also being gradually increased up to 90 grams and the quantity of syrup up to 20 grams, for the last charge.

A weight of coated tablets which is slightly greater than 1000 grams is finally obtained, with the result that the engrossment obtained is 50% in less than one hour.

The above conditions are reproduced exactly with the other three powders.

It is noted that more sticky products and a less uniform coating are obtained with the powder which has a maltitol purity of only 87%.

Characteristics of the products obtained.

The products are analysed and tested a few days after coating.

Analytical data:

The water content of the tablets is found to be directly related to the nature of the maltitol powder employed. This content is higher than 4% in the case of the tablets prepared with the most impure maltitol powder and close to 3.2% for the maltitol powder of very high purity.

The total maltitol content of the coating, which approaches 90% in the case of the use of the maltitol powder of very high purity, is only approximately 78% when using the product based on Malbit® CR and only approximately 65% for the pulverulent mixture containing titanium dioxide, mannitol and calcium carbonate.

Organoleptic data.

The products coated with the maltitol powder of 99% minimum purity are the whitest, followed by those prepared with the maltitol powder of 92% purity and by those with the Malbit® CR powder. The most greyish products are those prepared with the pulverulent mixture.

The biting textures of the various coated tablets are assessed by a tasting panel of 7 people using a blind test. The coatings of the coated tablets prepared with the most impure powders (Malbit® CR and pulverulent mixture containing 70% of maltitol of high purity) are judged unacceptable because of being too soft. The other two jellies are judged to be very satisfactory.

In respect of taste, the products are proportionately more appreciated, the higher their maltitol contents.

EXAMPLE III

Hard coating process with application in pulverulent form of a quantity of powder of very high purity.

1. Products employed.

Chewing gums formulated with polyols, that is to say with a Lycasin® 80/55 syrup and Neosorb® P60 sorbitol powder and in the form of a cushion approximately 2 centimeters in length by 1 centimeter in width are coated according to the process in accordance with the invention to obtain hard and crunchy coatings.

By way of comparison, the same products are coated with maltitol according to the process described in the Applicant Company's Patent EP 201,412.

In the first case the following are employed to carry out the invention:

a maltitol syrup which has a dry matter content of 70%, obtained by dissolving maltitol of very high purity marketed under the trade mark crystallized Maltisorb®. 2% of gelatin is added to this syrup, based on its dry matter content. This syrup is employed at 60° C.;

and a fine maltitol powder of very high purity, as defined in Example I.

In the second case only the above maltitol syrup is employed, diluted to a dry matter content of 60%. Its temperature of use is 45° C as described in the above patent.

2. Conditions

To produce the hard and crunchy coating of the invention, one kilogram of chewing gum cushions is placed in a rotating coater.

The maltitol syrup is applied a first time in a proportion of 15 milliliters. After one or two minutes a quantity of 30 grams of maltitol powder is added. The surface of the cushions is allowed to dry for one minute without the application of forced drying.

This cycle is repeated five times, the frequencies of application and the quantities introduced being increased.

During the last cycle the quantity of syrup added is 35 milliliters, whereas that of powder is 50 grams.

Finally, it is possible, but it is not essential, to subject the cushions to a ventilation for a quarter of an hour to assist the drying of the coating. The total coating period is approximately 45 minutes, for an engrossment of 20%.

In the second case, that is to say that in Patent EP 201,412, at least 60 cycles must be carried out, with tile result that the coating period is very long, since it requires 6 hours to 8 hours to obtain the same engrossment.

A very great time saving is obtained by applying the process in accordance with the invention, with the result that, for a given time, a quantity of products which is 6 to 7 times as large can be coated according to the process in accordance with the invention, when compared with those of the prior art. The energy costs are also lower.

3. Characteristics of the products obtained

The crunchiness and the hardness of the coatings of the above two types of products are compared 1 day and 7 days after manufacture.

The panel detects a slight difference at 1 day, the coating according to the invention appearing slightly less hard to bite. After one week this difference is no longer detected and the products are judged to be quite identical.

EXAMPLE IV

Frosting process with the application in pulverulent form of maltitol powder of

1. Products employed and conditions.

Frosting with maltitol is carried out on boiled sweets obtained as a result of cooking a mixture of Lycasin® 80/55 syrup and of mannitol.

To do this, a solution of gum arabic with a dry matter content of 40% is prepared. This is kept at 40° C.

The boiled sweets are introduced into a rotating coating turbine and then 25 milliliters of the gum arabic syrup are poured onto the surface of the sweets. After a few minutes 100 g of fine maltitol powder of very high purity, as described in Example I, are added.

Hot air is then blown into the turbine before a new coating cycle is optionally carried out according to strictly identical conditions.

2. Stability.

The stability of the frosted boiled sweets is compared with that of the same, unfrosted, boiled sweets in a water-uptake test consisting in recording in the course of time the changes in weight of products placed in conditions of very high humidity (75% relative humidity) at 20° C.

In this severe test it appears that the frosted products are markedly less sensitive to moisture, since they take up approximately 30% less water at the surface when compared with the control boiled sweets.

EXAMPLE V

Sanding process with the application in pulverulent form of a quantity of maltitol powder of very high purity.

1. Substances employed

Sanding of hard gums formulated by using polyols is carried out.

A powder obtained by screening maltitol crystals of 99.5% purity is employed for this purpose.

The particle size cut adopted is that of between 300 and 800 microns.

Furthermore, dry steam is employed for moistening the surface of the gums.

2. Conditions and results.

200 g of maltitol crystals selected as above are poured into a coating turbine, followed by approximately 1 kilogram of hard gums moistened beforehand.

The coating is carried out by rotating the turbine. After approximately ten minutes the products are withdrawn from the turbine and then stored in the open air for a few hours before being packaged.

The final products have a highly attractive, pretty surface.

We claim:

1. Process for coating the surface of a product with maltitol, comprising the application of a carbohydrate syrup, of a protein syrup or of steam and the application in pulverulent form of a quantity of maltitol powder having a purity higher than 87%.

2. Coating process according to claim 1, wherein the maltitol powder has a purity higher than 90%.

3. Coating process according to claim 2, wherein the maltitol powder has a purity higher than 95%.

4. Coating process according to claim 3, wherein the maltitol powder has a purity higher than 98%.

5. Coating process according to claim 1, wherein the carbohydrate syrup is a maltitol syrup.

6. Coating process according to claim 1, wherein the carbohydrate syrup is a syrup of low-calorie saccharides selected from the group consisting of polydextroses, oligofructoses, dextrins, celluloses, gum arabic, pectins and sugar alcohols.

7. Coating process according to claim 1, wherein the protein syrup is a bone or skin gelatin syrup.

8. Coating process according to claim 1, being a process of gumming, soft coating, sanding, frosting, hard coating or smoothing.

9. Coating process according to claim 1, the product to be coated being selected from the group consisting of a food, a pharmaceutical or veterinary product, a product for animals, a dietetic product, a seed or a grain, a fertilizer product or an additive based on enzymes, microorganisms, vitamins, flavours, perfumes, acids, sweeteners or active principles.

* * * * *